(12) United States Patent
Denis et al.

(10) Patent No.: US 12,537,708 B2
(45) Date of Patent: Jan. 27, 2026

(54) METHOD OF COLLABORATIVE DECISION-MAKING BETWEEN REMOTE DEVICES

(71) Applicant: People Supported Technologies Limited, London (GB)

(72) Inventors: Georgina Denis, London (GB); Niccolo Pescetelli, London (GB)

(73) Assignee: PEOPLE SUPPORTED TECHNOLOGIES LIMITED, London (GB)

( * ) Notice: Subject to any disclaimer, the term of this patent is extended or adjusted under 35 U.S.C. 154(b) by 6 days.

(21) Appl. No.: 18/722,999

(22) PCT Filed: Dec. 23, 2022

(86) PCT No.: PCT/EP2022/087755
§ 371 (c)(1),
(2) Date: Jun. 21, 2024

(87) PCT Pub. No.: WO2023/118577
PCT Pub. Date: Jun. 29, 2023

(65) Prior Publication Data
US 2025/0088379 A1     Mar. 13, 2025

(30) Foreign Application Priority Data

Dec. 23, 2021 (GB) .................... 2118875

(51) Int. Cl.
*H04L 12/18* (2006.01)
*H04L 65/1069* (2022.01)
(Continued)

(52) U.S. Cl.
CPC ...... *H04L 12/1822* (2013.01); *H04L 12/1831* (2013.01); *H04L 65/1069* (2013.01); *H04L 65/403* (2013.01); *H04L 65/80* (2013.01)

(58) Field of Classification Search
CPC ............ H04L 12/1822; H04L 12/1831; H04L 65/1069; H04L 65/403; H04L 65/80; H04L 12/18; G06Q 10/10
See application file for complete search history.

(56) References Cited

U.S. PATENT DOCUMENTS

2006/0101057 A1 * 5/2006 Farkkila ............... G06Q 10/00
                                                        707/999.102
2014/0057240 A1   2/2014 Colby et al.
(Continued)

FOREIGN PATENT DOCUMENTS

WO   2008063861 A2   5/2008
WO   2008063861 A3   5/2008
WO   2018236562 A1   12/2018

OTHER PUBLICATIONS

Wikipedia, "Time server", Jan. 8, 2014, pp. 1-2, retrieved on Jan. 11, 2016, retrieved from Internet: https://en.wikipedia.org/w/index.php?title_server&oldid=619854786.

(Continued)

*Primary Examiner* — Tonia L Dollinger
*Assistant Examiner* — Mehulkumar J Shah
(74) *Attorney, Agent, or Firm* — COATS & BENNETT, PLLC

(57) ABSTRACT

A computer-implemented method of collaborative decision making between a plurality of participant devices is described. The method comprises: establishing a connection between a server and each of the participant devices, wherein the participant devices are remote from the server: assigning to each of the participant devices connected to the server one of a plurality of options; and (a) establishing, by the server, a plurality of device groups and assigning each of the participant devices to one of the device groups such that there are two or more differing assigned options across the (Continued)

participant devices of each device group, the set of assigned options across a device group being defined as an option set; and establishing, by the server, one or more master groups, each master group comprising one or more device groups which are assigned the same option set. Then, the method further comprises (b) within each device group: (b1) transmitting to each of the respective plurality of the participant devices data comprising the option set assigned to the device group; (b2) establishing a communications link, via the server, between the participant devices of the device group, allowing communications between all devices within the device group for a set time period; (b3) receiving, at the server, a selection from each of the respective plurality of the participant devices of one of the options of the option set transmitted to it in step (b1), where the option that received the most selections within the device group is defined as the device group selection; and (c) assigning, by the server, the consensus option of each master group to each of the participant devices within the master group, thereby replacing the option previously assigned to each participant device. The consensus option comprises either: the option that received the most selections across all participant devices within the master group; or the option that received the most device group selections across all device groups of the master group. The method then comprises (d) closing the device groups; performing at least one further iteration of steps (a) to (d) and outputting a decision result comprising the one or more remaining options assigned across the participant devices.

17 Claims, 8 Drawing Sheets

(51) Int. Cl.
 *H04L 65/403* (2022.01)
 *H04L 65/80* (2022.01)

(56) References Cited

U.S. PATENT DOCUMENTS

| | | |
|---|---|---|
| 2016/0255126 A1 | 9/2016 | Sarris |
| 2018/0375676 A1* | 12/2018 | Bader-Natal .......... H04M 3/567 |
| 2022/0303321 A1* | 9/2022 | Ostrand .............. H04L 65/4015 |
| 2023/0199120 A1* | 6/2023 | Panchaksharaiah ........................ H04L 65/4015 |

OTHER PUBLICATIONS

Wikipedia, "Consensus decision-making", Jan. 30, 2015, pp. 1-18, retrieved on Aug. 4, 2016, retrieved from Internet: https://en.wikipedia.org/w/index.php?title=consensus_decision-making&oldid=644846809.

Microsoft Education, "How to create a quick poll in Microsoft Teams", Dec. 1, 2020, pp. 1-2, retrieved on Feb. 27, 2023, retrieved from Internet: https://www.youtube.com/watch?v=jkDnrqkx7al, youtube.

Stratvert, K., "How to add Poll to Microsoft Teams Meeting", May 4, 2020, pp. 1-2, retrieved on Feb. 27, 2023, retrieved from Internet: https://www.youtube.com/watch?v=ZOJwgwySvag, youtube.

Illustrative Tutor, "How to Create and Launch Polls in Zoom Meetings/Zoom Polls Tutorial", Aug. 13, 2020, pp. 1-2, retrieved on Feb. 27, 2023, retrieved from Internet: https://www.youtube.com/watch?v=UrNAxPloan4, youtube.

* cited by examiner

| | Iteration 1 | | | | Iteration 2 | | | | Iteration 3 | | | |
|---|---|---|---|---|---|---|---|---|---|---|---|---|
| Device_group | user_id | user_id | user_id | | Device_group | user_id | user_id | user_id | | Device_group | user_id | user_id | user_id |
| 1 | 1 | 2 | 3 | | 1 | 1 | 4 | 7 | | 1 | 1 | 10 | 19 |
| 2 | 4 | 5 | 6 | | 2 | 2 | 5 | 8 | | 2 | 2 | 11 | 20 |
| 3 | 7 | 8 | 9 | | 3 | 3 | 6 | 9 | | 3 | 3 | 12 | 21 |
| 4 | 10 | 11 | 12 | | 4 | 10 | 13 | 16 | | 4 | 4 | 13 | 22 |
| 5 | 13 | 14 | 15 | | 5 | 11 | 14 | 17 | | 5 | 5 | 14 | 23 |
| 6 | 16 | 17 | 18 | | 6 | 12 | 15 | 18 | | 6 | 6 | 15 | 24 |
| 7 | 19 | 20 | 21 | | 7 | 19 | 22 | 25 | | 7 | 7 | 16 | 25 |
| 8 | 22 | 23 | 24 | | 8 | 20 | 23 | 26 | | 8 | 8 | 17 | 26 |
| 9 | 25 | 26 | 27 | | 9 | 21 | 24 | 27 | | 9 | 9 | 18 | 27 |

| table_id | option_id | option_id | option_id | | table_id | option_id | option_id | option_id | | table_id | option_id | option_id | option_id |
|---|---|---|---|---|---|---|---|---|---|---|---|---|---|
| 1 | 1 | 2 | 3 | | 1 | 1 | 5 | 8 | | 1 | 5 | 12 | 24 |
| 2 | 4 | 5 | 6 | | 2 | 1 | 5 | 8 | | 2 | 5 | 12 | 24 |
| 3 | 7 | 8 | 9 | | 3 | 1 | 5 | 8 | | 3 | 5 | 12 | 24 |
| 4 | 10 | 11 | 12 | | 4 | 12 | 13 | 16 | | 4 | 5 | 12 | 24 |
| 5 | 13 | 14 | 15 | | 5 | 12 | 13 | 16 | | 5 | 5 | 12 | 24 |
| 6 | 16 | 17 | 18 | | 6 | 12 | 13 | 16 | | 6 | 5 | 12 | 24 |
| 7 | 19 | 20 | 21 | | 7 | 21 | 24 | 25 | | 7 | 5 | 12 | 24 |
| 8 | 22 | 23 | 24 | | 8 | 21 | 24 | 25 | | 8 | 5 | 12 | 24 |
| 9 | 25 | 26 | 27 | | 9 | 21 | 24 | 25 | | 9 | 5 | 12 | 24 |

METHOD OF COLLABORATIVE DECISION-MAKING BETWEEN REMOTE DEVICES

FIELD OF THE INVENTION

The invention relates to a computer-implemented method of collaborative decision-making between a plurality of participant devices.

BACKGROUND TO THE INVENTION

Within many organisations such as businesses, government departments and academic institutions, people communicate and exchange information with one another from different locations through devices in communication over networks such as the internet. Often the users and their devices are dispersed across different locations remote from one another (for example different buildings, cities or countries) and therefore rely on their devices to facilitate discussions and decision-making between them, for example using instant messaging and videoconferencing applications.

Demand for remote communications tools of this kind has increased significantly as a consequence of rapid and widespread adoption of home working practices during the coronavirus pandemic. Many organisations have had to adapt to having the majority, if not all, of their workforces working remotely from home and being unable to meet and communicate in person. Under these circumstances, organisations have had to employ these technologies to facilitate making decisions that require involvement of groups of people, which might previously have relied at least in part on in-person meetings and other modes of interaction that depend on the people involved being together at the same physical site.

Videoconferencing applications such as Zoom and Microsoft Teams are prominent examples of tools that have been adopted by organisations in light of this change in working patterns. While applications of this kind are reasonably successful at emulating one-on-one conversations, conversations conducted by this medium become very difficult to manage and follow when large numbers of users are present, particularly during moments when several users are attempting to speak or present at the same time. This is an issue in particular for deliberative meetings, in which often all of the users present wish to share and discuss information with the rest of the group, in which case the time required to discuss all of the information increases linearly with the number of users present. There is hence a need for a way of enabling groups of remotely-connected users to produce decisions in a consistent and time-efficient manner.

SUMMARY OF THE INVENTION

In a first aspect of the invention there is provided a computer-implemented method of collaborative decision making between a plurality of participant devices, the method comprising: establishing a connection between a server and each of the participant devices, wherein the participant devices are remote from the server; assigning to each of the participant devices connected to the server one of a plurality of options;
  (a) establishing, by the server, a plurality of device groups and assigning each of the participant devices to one of the device groups such that there are two or more differing assigned options across the participant devices of each device group, the set of assigned options across a device group being defined as an option set; and establishing, by the server, one or more master groups, each master group comprising one or more device groups which are assigned the same option set;
  (b) within each device group:
  (b1) transmitting to each of the respective plurality of the participant devices data comprising the option set assigned to the device group;
  (b2) establishing a communications link, via the server, between the participant devices of the device group, allowing communications between all devices within the device group for a set time period;
  (b3) receiving, at the server, a selection from each of the respective plurality of the participant devices of one of the options of the option set transmitted to it in step (b1), where the option that received the most selections within the device group is defined as the device group selection;
  (c) assigning, by the server, the consensus option of each master group to each of the participant devices within the master group, thereby replacing the option previously assigned to each participant device, where the consensus option comprises either:
  the option that received the most selections across all participant devices within the master group; or
  the option that received the most device group selections across all device groups of the master group;
  (d) closing the device groups;
  performing at least one further iteration of steps (a) to (d) and outputting a decision result comprising the one or more remaining options assigned across the participant devices.

The term "server" here designates the computing infrastructure through which features of the method such as the device groups are implemented and managed. It will be understood that the server is not necessarily a single physical machine: for example, it could be implemented by a distributed computing system and may employ modules managed by third parties (e.g. to provide functions such as audio and video chat between the participant devices). Typically the instructions (e.g. code) that dictate the steps of the method will be stored on the server, in which case the participant devices do not require any specialised software in order to take part in the method.

The steps of the method are preferably performed by the server. In particular, after devices have connected to the server, the server performs steps (a) to (d) in an automated manner. The server further performs subsequent iterations of the method in an automated manner, automatically establishing new device groups and moving participant devices between device groups according to the rules defined in claim 1 and described below, until the initial list of options has been reduced to a selection of one or more options which is output at the results of the collaborative decision-making process.

In the context of this method, establishing connections between each of the participant devices and the server means that each participant device is permitted and configured to receive data (for example the options transmitted to it in step (b1)) from, and transmit data (such as its vote in step (b3)) to, the server. For example, as will be described in detail later with reference to preferred embodiments, the participant devices may subscribe to a table on the server which maintains information about the state of the discussion. In these embodiments, changes in the table can for example prompt the participant devices to move between web pages representing different stages of the method.

A "device group" is a group of participant devices which are in communication with one another (via the server) during one iteration of steps (a) to (c). Establishing a device group thus means permitting communications between the plurality of the participant devices that will constitute that device group for the current iteration. Typically the participant devices will be prevented from communicating with other participant devices outside of their respective device groups for the part of each iteration during which the device groups are in existence (i.e. between being established in step (a) and closed in step (b5)). The participant devices within the device group may be allowed to exchange information such as text-based messages or engage in audio or video chat throughout some or all of the iteration, for example. At the end of each iteration in step (d), the device groups are closed, meaning that communications between the participant devices are no longer managed on the basis of their membership of a specific device groups. Typically the allocation of participant devices to device groups in each iteration of step (a) will be randomised or otherwise controlled to promote or ensure that each participant device encounters different other participant devices from one iteration to the next. A "master group" is a group of one or more device groups. While the participant devices are typically permitted to communicate only with the other participant devices within their respective device groups during each iteration of steps (a) to (d), the option assigned to each participant device in step (c) is that which received the most selections within its respective master group. The device groups preferably contain the same number of participant devices or, where this is not possible all include the same number of participant devices±1 device.

Each of the options assigned to the participant devices may represent a respective one of a plurality of ideas to be deliberated upon by the group. The data transmitted to each of the participant devices in step (b1) could include, for example, text and/or video information about each of the ideas assigned to participant devices within that device group. The options could originate with the participant devices themselves (in which case the participant devices could each transmit an option to the server prior to establishing the device groups) or elsewhere, for example being provided by an administrator who is managing the discussion. The transmission of the assigned options to each of the participant devices in step (b1) effectively allows each participant device to 'pitch' its assigned idea to other participant devices within the device group. The users of the participant devices may review the information that they have received and then submit a vote for their preferred option in step (b3), possibly after discussing the options with the other devices which they are in communication in step b2 (as will be the case in some preferred embodiments, which will be discussed later). Since each participant device is assigned the winning option from its master group at the end of each iteration, it will proceed to 'pitch' this option during the next iteration in step (b1) to whichever other devices occupies a device group with for that iteration.

The method of the invention enables a group of users, who will be in communication via the server by means of their respective participant devices, to deliberatively reduce the set of options that are assigned to the participant devices at the outset to a single, winning option, thereby producing a decision corresponding to that winning option. Typically the number of options in play falls with each iteration, since the winning option from each device group is assigned to each participant device in that set and then carried forward by each of those devices for the next iteration (while the other options considered by that device group are not assigned to members of that device group). Eventually, through successive iterations of steps (a) to (d), the initial plurality of options is reduced to a single winning option, which occurs when each of the discussion rooms returns the same option as its winning option within a single iteration.

The structured decision-making process provided by the method of the invention has several advantages over the use of known videoconferencing applications and the like as discussed above. Firstly, it does not suffer from the technical drawbacks associated with video and audio conference calls when conducted between large numbers of devices, where the simultaneous exchanging of data through a single interface quickly becomes unmanageable as the number of devices grows. By automatically establishing and synchronising a plurality of restricted-size device communication groups and iteratively closing and creating new groups between which devices are moved by the server, each user is in communication with only a subset of the group composed of those other users whose participant devices are assigned to the same device group. This permits (as will be the case in some preferred embodiments) deliberation and discussion to take place within each device group between transmitting the ideas and collecting the votes, but allows the number of devices taking part in each such discussion to be managed so as to mitigate the issues that arise when large numbers of devices are in communication through a single audio and/or visual channel. In particular, by providing a server configured to manage and synchronise a sequence of device groups based on the selections received from the participant devices the amount of data required to be transferred between devices to reach a decision is significantly reduced, given the increased efficiency in the communications.

Secondly, as will be illustrated by reference to an example later, the time taken to reach a decision is reduced significantly in comparison to an approach by which all of the ideas are discussed in turn by all of the users as a single group. The number of iterations of steps (a) to (d) required to reduce an initial set of N ideas to a single winning idea—and hence the time taken to produce a decision—scales in proportion to log (N) (whereas, as noted above, the time taken for a group to discuss a set of ideas generally scales linearly with the number of ideas). The invention thus provides a time-efficient and structured approach to producing a decision by a group of remote users.

In some examples of the invention the method may be performed until the initial number of options has been reduced below a threshold number, for example to identify a number of options, for example 3 or 5 options, which are output as the result of the collaborative decision process. In preferably examples further iterations of steps (a) to (d) are performed until there is one remaining option assigned across the participant devices. In this way, the method is used to identify a single winning option from the initial list of options assigned to the participant devices in the first iteration.

As noted above, the communications between the participant devices in step (b2) may comprise audio communications. For example, the users of the participant devices may participate in voice chat through using an audio channel that is enabled during step (b2). The audio communications may be recorded, in which case the method may comprise transcribing some or all the recorded audio to produce a transcript of the audio communications.

Preferably step (c) comprises, in the case that there is no one option that received the most selections across all participant devices or device groups within the master group, determining the consensus option by one of the following steps: selecting one of a plurality of options that received the most selections by random selection; receiving a selection of one of a plurality of options that received the most selections from an administrator device; processing data exchanged between the participant devices of the device groups during the set time period and selecting an option that was discussed for the longest time period.

In particular, depending on the number of participant devices and size of the device groups and master groups, in some examples there may be no single option that receives more selections that any other (whether that is more device group selections or more participant device selections from participant devices across the master group). In this case there will be a plurality of options that have jointly received the most selections and the method must determine of this plurality of options to designate as the consensus option and assign to all devices in the master group. A computationally efficient method is to simply selection an option by random selection performed automatically by the server. An alternative is to rely on an administrator selection from the plurality of joint winning options. In particular a notification may be sent to an administrator device with a request to select from the plurality of joint winning options. The server may send all or one or more extracts of the data exchanged during the set time period, for examples text, audio or video data corresponding to the discussion regarding the joint winning options. The administrator then inputs a selection of the chosen option, which is received by the server and determined as the consensus option.

Alternatively, the consensus option may be selected from the plurality of options that received equal most selections by the server in an automated process. In particular, the data exchanged within the device groups during the set time period may be analysed by an algorithm to determine a consensus option. This method may include processing the data exchanged within the device groups to determine a consensus options as the option (of the options have received the joint most selections) that was discussed for the longest time period; and or mentioned in the data sent by the most devices within the device group or master group. The algorithm may comprise a natural language processing model configured to identify portions of the data exchanged during the set time period, corresponding to one of the plurality of options that received the joint most selections.

Using one of these methods, a tie between options have received the equal most number of selections may be resolved and a consensus option determined and assigned to all devices within the master group.

Preferably the server performs steps (a) to (d) in sequence according to a set time schedule, and/or in response to communications received from the participant devices. In particular, the server is configured to step through a sequence of steps at predetermined intervals. In this way, the method is completed in the shortest time possible, with the amount of data to be exchanged controlled, which is particularly advantageous as the number of participant devices increases. For example the server establishes the device groups, configures their communication links and sets the active communication period for a set time period, before closing all groups simultaneously and re-establishing new groups simultaneously based on the determined consensus options. This ensures that the method does not have to wait for certain device groups to finish deliberation, given all device groups must have made a selection for the next iteration of groups to be established.

Preferably the server maintains a central clock and one or more of the steps are synchronized according to the central clock. Given that the scheduling is time critical and all device groups must be closed and established simultaneously, the server must have a reliable method to coordinate the steps. Since all steps are performed by the server, the server may use a server clock to coordinate the actions and perform the scheduled steps according to its own clock. This would not be possible where steps are reliant on the actions of participant devices in order to be performed, as this would require relying on the local clocks of the participant devices. By configuring the method such that all actions are performed in an automated manner by the server, a central clock can be used to schedule the steps and therefore the method outputs a decision result in the shortest time possible and with increased computational efficiency, minimizing the exchange of data. For steps that require input by the participant devices, notably receiving a selection of an option, if an option has not been received within a set time period, the server discounts the participant device when tallying the selections. Alternatively the server automatically assigns a selection to the device, for examples based on the processing of data exchanged by the device during the set time period or according to its existing assigned option.

Preferably the server synchronises the set time period across all device groups such the set time periods start and end at the same time according to the central clock. In this way the iterations progress as efficiently as possible as the server never has to wait for a device group deliberation to end in order to move to the next step of the method.

For the same reasons, preferably step (d) is performed at a predetermined time interval after establishing the device groups, wherein the predetermined time interval is measured by the central clock maintained by the server.

Preferably the method further comprises, after establishing a connection between the server and each of the participant devices: receiving, at the server, option data from each of the participant devices, the option data comprising an option proposed by the participant device, where the option data comprises one or more of text, audio and video data; and assigning the proposed option to the respective participant device. In particular, each participant device may be requested to provide an option to be deliberated. The server receives data comprising the option to be deliberated and decided upon. The option may be provided in the form of a text document, audio or video file, in which the option is described. The data is sent to other participant devices so that they can understand the options to be deliberated upon.

In some examples, the option data comprises an editable text document, wherein step (b3) comprises: receiving, from one or more participant devices, an edited version of a text document comprising an option received from another participant device of the device group. In this way, options may be editable during the process, allowing for input from multiple participant devices. The documents may be locked for editing, within editing only allowed during certain steps of the method and/or certain iterations. For example, a text document may only be editable after it has been selected and assigned to a participant device, after which it may be edited before being sent to other member of the device group for deliberation.

Preferably, on the second and any subsequent iterations step (a) comprises: allocating each participant device to a respective one of the device groups so as to minimize the number of participant devices that have been in the same device group in a previous iteration. In this way it is ensured that options are deliberated with different combinations of device groups to ensure the strongest consensus selection.

In preferred embodiments, the method further comprises, before step (a): receiving, by the server, information identifying each of the participant devices; and verifying that each of the participant devices identified in the received information is in communication with the server. By performing these steps before beginning the iterative sequence of steps (a) to (d), it is ensured that all participant devices are in communication with the server at the outset and thus ready to participate at the same time. This is beneficial particularly when the method is intended to be performed in keeping with a predetermined schedule (for example where the votes are collected in step (b2) once a predetermined amount of time has passed after step (b1)). Where this verification step is performed, in particularly preferred embodiments, it comprises: establishing, on the server, a waiting room in communication with each of the participant devices, and recording on the server presence data about each of the participant devices in communication with the waiting room, wherein the presence data identifies whether the participant device is in communication with the server. The presence data could simply include data such as a flag indicating that the participant device is in communication with the server, but recording the presence data could also include gathering other information such as by asking the user to provide a positive indication that they are ready to take part in the discussion. Optionally, the method may further comprise before step (a), verifying that the recorded presence data confirms that each of the participant devices identified in the received information is in communication with the server.

Advantageously the method may further comprise transmitting, to each of the participant devices in communication with the waiting room, information identifying each of the other participant devices in communication with the waiting room.

In preferred embodiments the data transmitted in step (b1) comprises one or more of text, images, audio and video.

As noted above, it is preferred if the allocation of participant devices to device groups in successive iterations of step (a) is conducted such that each device is placed into sets with different other devices from one iteration to the next. Hence, in preferred embodiments, step (a) comprises: randomly allocating each participant device to a respective one of the device groups, and establishing communications between each of the device groups and the participant devices allocated to it.

Advantageously, the server may maintain a clock. The provision of a clock on the server is beneficial wherever the steps of the method are time-sensitive: for example, in some preferred embodiments, all of the device groups for any given iteration of steps (a) to (d) are established simultaneously. This allows the method to avoid relying on timings maintained by the participant devices, which are very likely to disagree with one another on the precise time at any instant. Preferably, in step (a) communications between each of the participant devices and the respective device groups are established simultaneously by reference to the clock. Each iteration thus proceeds simultaneously for all participant devices. Furthermore, step (d) is preferably performed at a predetermined time interval after establishing the device groups, wherein the predetermined time interval is measured by the clock maintained by the server. This ensures that each iteration concludes at the same time for all participant devices and can thus ensure that each device group is allowed the same time to consider the options assigned to the devices within that set and vote for a winning option.

In preferred embodiments, the method further comprises, between steps (b1) and (b2), facilitating, by the server, intercommunications between the participant devices in communication with the device group for discussion of the options to be voted on. This allows the users of the participant devices within each device group to discuss the options that have been transmitted to them before voting on them in step (b2). For example, the intercommunications may comprise one or more of text-based messages, audio and video.

BRIEF DESCRIPTION OF THE DRAWINGS

Examples of methods in accordance with embodiments of the invention will now be described with reference to the accompanying drawings, in which:

FIGS. 4(a) to 4(b) depict the composition of a group of participant devices and their associated options in successive iterations of the method illustrated in FIG. 2.

DETAILED DESCRIPTION

Figure 1:
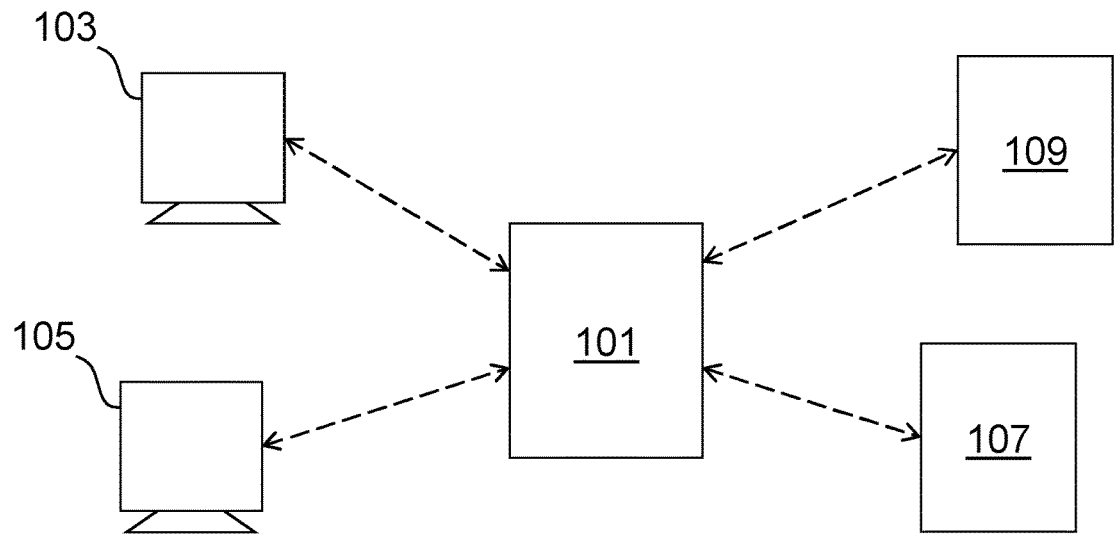
FIG. 1 shows schematically an example of a computing infrastructure suitable for implementing methods in accordance with the invention.

FIG. 1 is a schematic representation of a computing infrastructure suitable for implementing methods in accordance with the present invention. This infrastructure includes a server 101, which is configured (for example by suitable software stored on the server) to coordinate the steps of the method. As noted above, it will be appreciated that the server 101 is not necessarily a single machine and could exist in some implementations as a collection of distributed components. The role of the server in implementing methods in accordance with the invention will be described in more detail later. A plurality of participant devices 103, 105 may communicate, as represented by dashed arrows, with the server 101 over a network such as the internet or an organisation's local intranet. The participant devices will typically be personal devices such as desktop or laptop computers, tablets and smartphones. It will be appreciated that while two participant devices are shown in this schematic illustration, typically many more participant devices will take part in any instance of the method. The server 101 may maintain an internal clock, the use of which will be discussed below.

The server 101 may also be in communication with one or more third-party services 107, 109, which may implement features of preferred embodiments such as audio and/or video chat functions.

Figure 2:
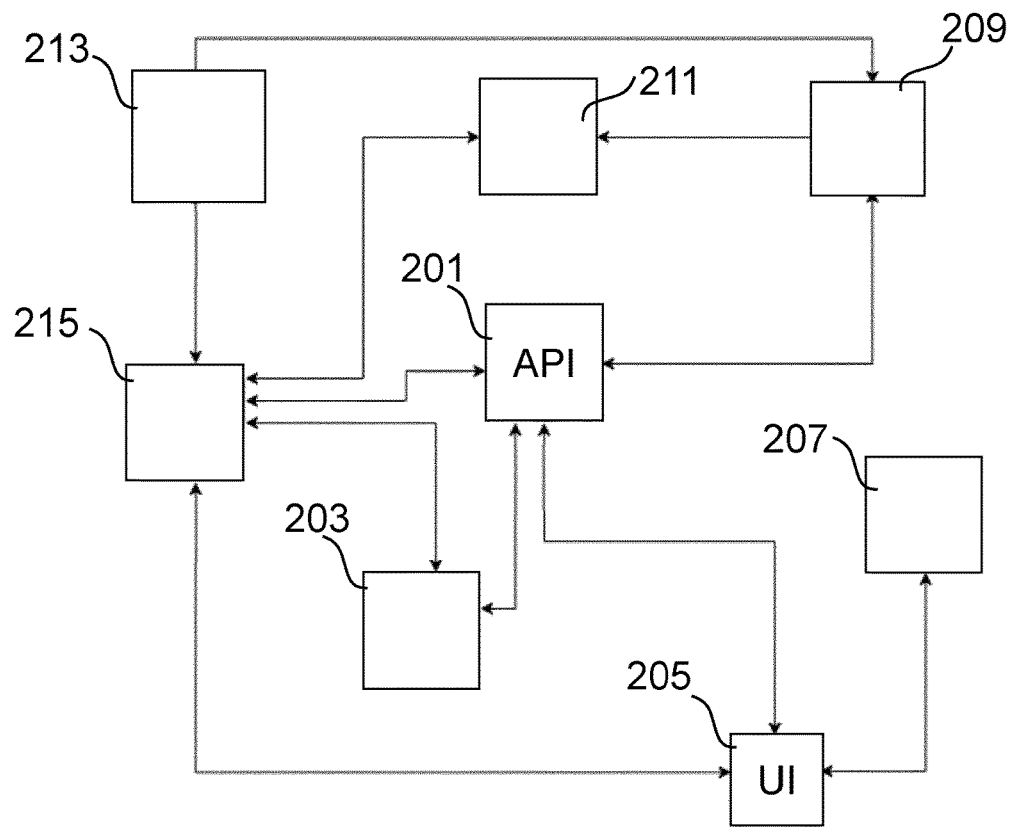
FIG. 2 shows an application architecture suitable for implementing methods in accordance with embodiments of the invention.

FIG. 2 is a diagram illustrating an example of an application architecture suitable for implementing embodiments of the invention. All of the components shown in this diagram may be implemented by software on the server, but some may also be provided by third-party services 107, 109 in communication with the server, specific examples of which will be highlighted below.

Central to the application architecture is an API component 201, which may be hosted by the server 101 described above. The API component 201 controls the progression of the method through its various steps, which may be administered using a table stored on the server in which information about the current state the discussion is stored. The user devices 103, 105 interact with the API component 201 via an interface component 205, which facilitates communications and transmission of information between the server 101 and the participant devices 103, 105. In some preferred embodiments, which will be discussed in more detail below, the participant devices 103, 105 in communication with the server access different webpages during different steps of the method, and the API component 205 may control access to these web pages.

The API component 201 generates functions 209 with which it can instruct a mailing component 211 and a storage component 213. The mailing component 211 may be configured to send to the participant devices 103, 105 invitations (for example in the form of emails) containing information enabling the participant devices to enroll in an instance of the decision-making method to be performed. The storage component 213 is configured to store, on the server, information such as text, images and audio and video recordings relating to the options that each participant device 103, 105 will pitch in the course of performing the method. This information may be received directly from the participant devices 103, 105 through the interface component 205, for example.

In this example, communications between the participant devices 103, 105 and the mailing component 211, storage component 213 and API component 201 may be mediated by an authentication component 215 configured to authenticate the participant devices 103, 105 before allowing them to communicate with the components of the application.

The architecture include an administrator interface component 203, which provides a user interface through which an administrator may manage the application and the discussions that it implements. For example, an administrator may access the administrator interface 203 in order to schedule a future discussion, including providing information identifying the participant devices that will take part in the discussion. The API component may then generate a function 209 instructing the mailing component 211 to issue invitations to the participant devices identified by the administrator.

In this example the architecture includes a conferencing component 207, which facilitates audio and/or video calls between groups of participant devices 103, 105. In this case the conferencing component 207 is provided by a third-party service which is not directly in communication with the API component 201. When the API component 201 wishes to establish a call between participant devices, it issues information to the participant devices through the interface component 205 which enables the participant devices to establish and join a call implemented by this service. Of course, in other embodiments the conferencing component 207 may be implemented on the server 101, in which case it may be directly instructed by the API component 201.

When the communications between participant devices facilitated by the conferencing component 207 include audio communications, the audio may be recorded. The application may include a transcription component (not shown) that produces transcripts of the recorded audio (i.e. text data representing the speech in the recorded audio). The transcription component could include an off-the-self audio transcription or speech recognition service such as AWS Transcribe.

Figure 3:
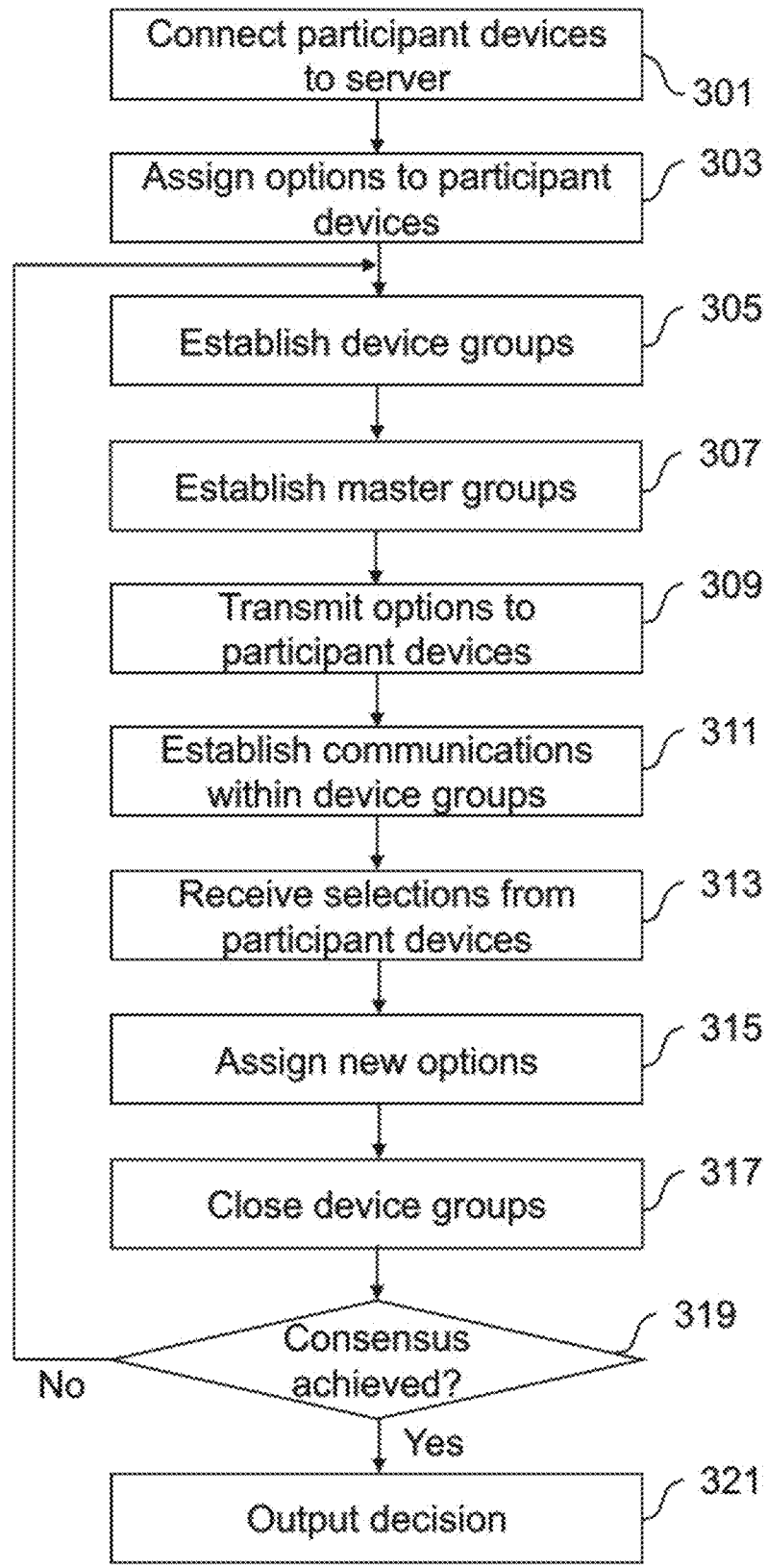
FIG. 3 is a flowchart representing an example of a method in accordance with an embodiment of the invention.

FIG. 3 is a flowchart representing an example of a method in accordance with an embodiment of the invention. This method may be implemented by the exemplary computing infrastructure and application architecture described previously. The method enables the set of participant devices to collaboratively produce a decision corresponding to one of a plurality of options from which one is to be selected. The process of performing the method so as to produce a decision between a plurality of participant devices will be referred to as a "discussion" between those participant devices below. It will be appreciated that not all of the step described must be performed in the exact order shown in FIG. 3: for example, steps 307-311 may in principle be performed in any order without affecting the outcome of the method.

At step 301, a plurality of participant devices 103, 105 are connected to the server 101. As noted previously, the established connections are typically facilitated by a network such as the internet. Step 301 may also involve subscribing each of the participant devices to a table on the server 101 (such as that managed by the API component 201 as described previously) in order to enable each participant device to be informed of the current state of the discussion at all times.

At step 303, each participant device is assigned an option. Each option represents one of a plurality of ideas to be deliberatively reduced to one, which will constitute the decision produced at the end of the method, by the participant devices. For example, the options could represent alternative proposals for a course of action to be taken by an organisation such as a business or academic institution. Typically each option will include data such as text files and/or audio/video files. The data that constitutes each option may be provided by the devices before the method commences, for example by uploading the data to the server 101 via the user interface component 205 as described previously. The option assigned to each participant device in step 303 may be the option that was submitted by the participant device prior to commencing the method.

In some preferred embodiments, the options are editable text documents that are each assigned to a respective participant device. In the first iteration one solution is associated only to one participant device (the one that suggested it, for example by submitting the option prior to the discussion beginning). As the method progresses, and after every iteration of conversation, solutions are either discarded or gain more followers (i.e. are assigned to an increasing number of participant devices). In these preferred embodiments, during the discussion, the option remains editable by all participant devices assigned to it. This ensures that an option can benefit from the input and feedback of others providing constructive criticism. As a winning option spreads and acquires new followers, all followers are able to edit it. In these embodiments, the option may evolve like a collaboratively written document where more and more editors/writers are involved able to contribute over successive iterations.

After step 303, a plurality of device groups is established in step 305. Each device group comprises subset of the plurality of participant devices that were connected to the server in step 101. It is preferred that the device groups are so composed that each device group contains participant devices representing as many different options as possible, subject to the constraint that each device group typically contains a predetermined limited number of participant devices (and therefore may only contain as many options as there are participant devices in the device group). For example, the device groups could be produced by randomly distributing the participant devices into the device groups or by selecting the participant devices for each device group in accordance with a rule configured to enhance the diversity of options within each device group. For example, the rule could be configured to ensure that (or increase the likelihood of) some or all of the participant devices within each device group on subsequent iterations have not encountered one another on previous iterations. The allocation of participant devices into device groups may be performed in accordance with an optimisation algorithm that is configured to place together participant devices representing more similar options in the earlier iterations, then expose the participant devices to increasing more distant options as the method progresses through multiple iterations. This optimisation algorithm could employ machine learning techniques (for example natural language processing) performed on the options to be discussed in order to quantify the similarity and/or dissimilarity of the different options in relation to one another (for example in terms of a semantic similarity metric between terms that appear in the different options).

It is advantageous if all of the device groups are established simultaneously, for example by reference to the clock maintained by the server 101 described above. This makes it possible to ensure that all of the device groups are in communication with one another for the same amount of time, and the use of the server clock for this purpose mitigates errors which might otherwise arise if a different time signal (for example the time maintained by individual participant devices, which are likely to disagree with one another) were relied on. The availability of an accurate, synchronised time signal is important when simultaneously establishing the device groups simultaneously (and also when closing them simultaneously, as will be discussed later) since the discussion cannot proceed to the next iteration unless all of the participant devices have completed the steps of the present iterations.

The device groups established in step 305 are themselves placed into master groups in step 307. In the first iteration of steps 305-319, each master group consists of a single device group. In subsequent iterations, each master group is composed of a plurality of device groups. An example of a scheme for constructing device groups and master groups on each iteration of the method will be described below with reference to FIG. 4. Although they are shown as occurring sequentially in FIG. 3, steps 305 and 307 may be performed simultaneously.

In step 309, the options assigned to all of the participant devices within each device group are transmitted to all of the participant devices in that device group. In other words, each participant device receives the option assigned to it and the options assigned to the other participant devices within its device group. This transmitting may be coordinated by the API component 201 described above, for example based on a function 209 issued to the storage component 213 to transmit the options to the participant devices.

In step 311, the participant devices within each device group are put in communication with one another. While in communication with one another, the participant devices of each device group may exchange information with one another via the server 101 and/or third-party services such as the conferencing component 207 described previously. The communications link established in this step will be terminated when the device groups are closed in step 317.

Between establishing the communications link and closing the device groups, the participant devices may be permitted to exchange information continuously or only during constrained intervals, for example in the period of time before the participant devices transmit their selections in step 313.

In step 313, the server 101 receives, from each participant device, a selection corresponding to one of the options that was transmitted to it in step 309. This selection could be made by a user of the participant device 103, 105 through a user interface displayed on that device, for example. Step 313 may be performed at the same time for all device groups (for example by issuing simultaneously to all of the devices an invitation to select one of the options represented within the corresponding device group) by reference to the server clock, which ensures that all of the participant devices are given the same amount of time to discuss and select from the options within their respective device group.

The selections received within each master group are tallied and the option that received the most selections within a particular master group is designated as the consensus option for that master group. All of the devices within the master group are then assigned the consensus option of that master group, which replaces the options that were assigned to those participant devices at the time the device groups were formed in step 305 (which were assigned to the participant devices in step 303, if it is the first iteration of steps 305-319, or in the most recent iteration of step 315 if it is now the second or later iteration of steps 305-319). It should be noted that while the participant devices 103, 105 are permitted to communicate with the other members of their respective device group, the consensus options are determined by tallying the selections received across the master groups to which the device groups belong.

In the event that no one option receives more selections that all of the other options within a master group (such that two or more options are tied for the most selections), a rule may be implemented to ensure that a single option is assigned as required in step 319. For example, where two or more options are tied for the most selections within a master group, one of the tied options may be randomly selected and designated as the consensus option for that master group. Alternatively, an administrator could manually intervene (via the administrator UI component 203) to select a consensus option, or information such as data gathered from the intercommunications between the participant devices prior to submitting their selections could be processed (e.g. by a machine learning tool) to different the tied options.

In step 317, the device groups are closed by terminating the communications links between the participant devices of each device group which were established in step 311. The device groups may be closed simultaneously by reference to the server clock described previously.

In step 319, it is determined whether a consensus has been reached. A consensus is considered to have been found when there is a single master group remaining (i.e. the number of remaining options has been reduced such that all device groups are discussing the same option set) and device groups within the master group have all reached a device group selection. The option selected by the majority of the device groups within the final single master group is the consensus option. Otherwise, if there are still two or more master groups, there remain at least two options in play (since each master group discusses a different set of options).). If there is a consensus, the method proceeds to step 321 where a decision is output in the form of data representing the consensus option that was assigned to all of the participant devices in step 315. Outputting the decision could involve simply storing information on the server 101 indicating which option was decided upon or transmitting such information to all of the participant devices 103, 105, for example.

If it is determined in step 319 that a consensus has not been reached, the method returns to step 305 whereupon a further iteration of steps 305-319 begins. In this iteration of step 305, the participant devices are once again distributed into device groups, which typically will each consist of the same number of participant devices as on the previous iteration but preferably with a different combination of participant devices in each group to those present in the or each previous iteration. This could again be achieved by randomly distributing the participant devices into device groups or by distributing them in accordance with some other rule as described previously. The master groups established in step 307 may preferably contain more device groups than the master groups that were established in the previous iteration of this step. As noted previously, on the first iteration, each master group typically consists of only one device group, so on the second iteration, each master group could consist of three device groups (or any other number greater than one). In particularly preferred implementations, an example of which will be described later with reference to FIGS. 4(a) and 4(b), the size of the master groups is controlled such that on a predetermined iteration (e.g. the third iteration), all of the device groups belong to a single master group. This has the advantage of producing a decision within in a predetermined number of iterations, since once all of the participant devices belong to the same master group, they will all be assigned the same consensus option in step 315 and this will necessarily result in a consensus being considered to have been achieved in step 319.

The method continues to perform iterations of steps 305-319 until a consensus is determined to have been achieved in step 319, at which point a decision is output and the method ends as described above.

FIGS. 4(a) and 4(b) illustrate an example of an embodiment of the method above being performed in order to produce a decision within three iterations. The discussion in this example is between 27 participant devices, which on each iteration are divided into device groups each consisting of three participant devices. In the following discussion, we will explain what the tables and the values in them signify and then explain how the device groups and master groups in this embodiment of the method were produced.

FIG. 4(a) shows three tables 401, 402, 403 which represent the device groups and master groups that are established in each iteration. In each table, each row represents a device group (of which there are nine in each iteration), and the dark lines that enclose groups of the rows in each table 401, 402, 403 indicate that those tables together form a master group in the corresponding iteration. For example, on the iteration 1, each master group consists of a single device group, e.g. master group 411 consists of device group 1. On iteration 2, each master group consists of three device groups: master group 421 includes device groups 1, 2 and 3; master group 422 includes device group 4, 5 and 6; and master group 423 includes device groups 7, 8 and 9. In iteration 3, there is a single master group 431 which includes all nine device groups.

The numbers within the cells in each of the FIG. 4(a) tables are identifiers which each represent a particular participant device. For example, on the first iteration, which is represented by table 401, device group 1 consists of participant devices 1, 2 and 3. On the second iteration, represented by table 402, participant device 1 was again placed into device group 1 but participant devices 2 and 3 were placed in device groups 2 and 3 respectively. Device group 1 on this second iteration consists of participants devices 1, 4 and 7.

The tables 404, 405, 406 in FIG. 4(b) represent the options assigned to the participant devices shown in FIG. 4(a) at the beginning of each of the three iterations. Like in FIG. 4(a), each row represents a device group and each master group is represented by a dark outline around the set of device groups that forms the master group. The values within each row signify the options that are assigned to the participant devices at the corresponding positions in the FIG. 4(a) tables on each iteration: for example, in iteration 1, participant device 1 is assigned option 1, participant device 2 is assigned option 2, participant device 3 option 3 and so on. The values shown in table 404 for iteration 1 are those values that were assigned to the participant devices in step 303 of the method above, since this is the first iteration. In table 405, representing iteration 2, the values shown are those which were assigned to the participant devices in the first iteration of step 315 after tallying the selections received in the first iteration of step 313, since these are the assigned values that each participant device will have possessed at the outset of iteration 2. Similarly, the values shown in table 406 representing iteration 3 are those that were assigned to the participant devices in the second iteration of step 315.

In this example, in iteration 1, master group 411 (consisting of device group 1) produced option 1 as its consensus option. This means that in the selections submitted by the participant devices in that master group (i.e. participant device 1, 2 and 3) in the first iteration of step 313, option 1 was the most popular (i.e. received the most selections). This result is evident in table 405, where option 1 appears at the positions corresponding to participant devices 1, 2 and 3. Similarly, it can be seen that master group 421 produced option 5 as its consensus option in iteration 2, since the participant devices that belonged to master group 421 in iteration 2 can be seen in table 406 each to have begun iteration 3 with option 5 as their assigned option. In master group 423, options 21, 24 and 25 each received an equal number of selections, so a rule for tie-breaking had to be applied in order to progress to the next iteration. As discussed previously, this could have involved manual intervention by an administrator or some other rule (for example one that applies a machine learning technique to identify which of the tied solutions received more positive reactions during the discussion of the options).

The rules according to which the device groups and master groups in this example were composed will now be explained. In this example the number of participant devices, N, was 27 and in each iteration these device groups were placed into device groups each containing a minimum number, M, of 3 participant devices. The rules described below are in principle applicable to any plural number N of participant devices to be placed into to device groups of any minimum size M>1.

Iteration 1

In step 305 of iteration 1, a number T=floor(N/M) of device groups is established, where floor( ) is the floor function, which returns the greatest integer less than or equal to the value N/M being operated on. The N participant devices are distributed among the T device groups, so that participant devices 1 to M (i.e. users 1, 2 and 3, in the example of FIGS. 4(a) and 4(b)) are assigned to table 1;

participant devices (M+1):2M are assigned to device group 2; participant devices (2M+1) to 3M are assigned to device group 3; and so on. If the number of participant devices is greater than floor(N/M), the remaining participant devices (of which there will be x=modulo(N/M), where modulo( ) is the module function, which returns the remainder of the fraction being operated on), are assigned to the last or first x device groups. In this example, however, the 27 participant devices can be distributed evenly among the nine device groups.

The T device groups are then sorted into R master groups in step 307. In the first iteration, each master group contains only one device group. As will be seen below, each master group should consist of 1 device groups on iteration 1, M device groups on iteration 2, $M^2$ device groups on iteration 3, and so on.

Each participant device submits a selection in step 313 as described above, possibly after discussion period during which the participant devices within each device group may exchange information (e.g. messages) with one another. After the selections have been tallied, the option that received the most selections within each master group is assigned to all participant devices within that master group to be carried forward into the next iteration.

Iteration 2

In the second iteration, the participant devices are again divided into T=floor(N/M) device groups in step 305. In this example, one participant device from each of device groups 1-3 of the first iteration is placed into each of device groups 1, 2 and 3. Similarly, one participant from each of previous device groups 4-6 is placed into new device groups 4, 5 and 6 and one participant from each of previous device groups 7-9 is placed into new device groups 7, 8 and 9.

The master groups established in this iteration each contain three device groups. Master group 421 contains device groups 1-3; master group 422 device groups 4-6; and master group 423 device groups 7-9. The participant devices again submit their selections of the options represented within their respective device groups and are then assigned the consensus option produced by their respective master group to be carried forwards into iteration 3.

Iteration 3

In iteration 3, the participant devices are again distributed into nine device groups of different compositions to those established in the previous iterations. A single master group consisting of all nine device groups is established in this iteration. Because there is only one master group, which will produce a single consensus solution after the selections are received in step 313, iteration 3 in this example will result in a consensus being determined to have been reached in step 319.

In more general terms, this example of an approach to forming the device groups and master groups may be expressed as follows.

Let X be the rectangular matrix containing values identifying the participant devices (represented in the example above by the tables in FIG. 4(*a*)), with a number of rows equal to the number of device groups to be formed and a number of columns equal to M. Each row corresponds to a device group. On the first iteration only, each row also corresponds to a master group.

Let Y be the matrix containing participant devices' assigned options, with dimensions identical to X (the tables in FIG. 4(*b*), in the example above).

Let Z be a submatrix of X, representing master groups (indicated in FIGS. 4(*a*) and 4(*b*) by bold lines around individual device groups or sets thereof), with a number of columns equal to X and Y. In the first iteration, each master group Z has dimensions 1×M, on iteration 2 it has dimensions M×M, and on iteration 3 it has dimensions $M^2$×M and so on. The number of rows of matrix Z grows exponentially with exponent equal to the number of the iteration minus one (e.g. one row in iteration 1, three rows in iteration 2 and nine rows in iteration 3). This growth represents the fact that as options are discarded (as a consequence of only the consensus option from each master group being carried forwards by the participant devices of that master group), each master group contains more device groups discussing fewer options.

At the start of each iteration, participant device 1 is allocated to X(0,0). Participant device 2 is allocated to the next available space in the matrix by moving down a row, and so on for subsequent participant devices, until we hit the maximum number of rows of Z, for that iteration. If we hit this maximum value, we move to the next column starting again from row 0. Thus participant device 2 is assigned to X(0,1) on iteration 1, but is assigned to X(1,0) on successive iterations. After completing one master group, we move down to assign the next one.

Table 1 below lists and describes a set of variables that may be used by an algorithm that implements the example just described. The right-hand column "Controllable by admin?" indicates whether each value may or may not be manually set by an administrator.

TABLE 1

| Variable | Values/Range | Description | Controllable by admin? |
|---|---|---|---|
| problem_id | p = 1, 2, . . . , P | Unique identifier associated with a specific problem (for example identifying the particular discussion to be conducted by the method) | no |
| user_id | i = 1, 2, . . . , N | Unique identifier associated with a participant device | no |
| device_group_size | M = 5 (default) | The minimum device group size, set by the administrator for each individual problem. | yes |
| group_id | | Unique identifier associated with a specific group of participant devices debating at a table. | no |
| master_group_solutions_set | | The set of options that, on a given iteration, is evaluated and discussed in a master group | no |

TABLE 1-continued

| Variable | Values/Range | Description | Controllable by admin? |
|---|---|---|---|
| device_group_id | j = 1, 2, . . . T where T = floor(N/M) | Unique identifier associated with each device group. | no |
| master_group_id | z = 1, 2, . . . R | Unique identifier associated with each master group | |
| iteration_id | k = 1, 2, . . . K | Unique identifier associated with each iteration of the method | no |
| solution_id | s = 1, 2, . . . N | Unique identifier associated with a specific option | no |
| solution_content | Editable text variable | Content of a proposed solution describing the suggested action to be taken by the collective | no |
| discussion_time | t = 1 hour (default) | Time allowed for discussion within a device group and submitting selections within the device group | yes |

Some additional comments on selected values from Table 1 above are set out below.

device_group_size: Given that the number of participant devices involved in a problem discussion might not necessarily be an exact multiple of M (and might not be known in advance), M only represents the median number of participant devices in each discussion group. For instance, if M=3 and 26 participant devices are participating, then the number of tables will be 8, each containing a max of 4 seats, but with 3,3,3,3,3,3,4,4 people seating at them.

group_id: The number of group IDs will be higher than N/M given that each participant device will participate in multiple conversations (because multiple iterations are typically performed). On each iteration, a person will be assigned to a new group ID.

master_group_solutions_set: The number of options in the set will decrease with the number of iterations until only one option is left when the global consensus is reached.

device_group_id: Given that the number of participant devices and the size of the device groups does not change over the course of iterations, also the number of device groups does not change. Each table will host a different device group on every iteration.

iteration_id: The number of iterations needed to reach a consensus is determined by the number of users N and group size M.

solution_id: The number of options in play will decrease exponentially over iterations, as options are discarded.

solution_content: This content may be input by a participant device as a requirement to participate in a problem discussion.

Figure 5:
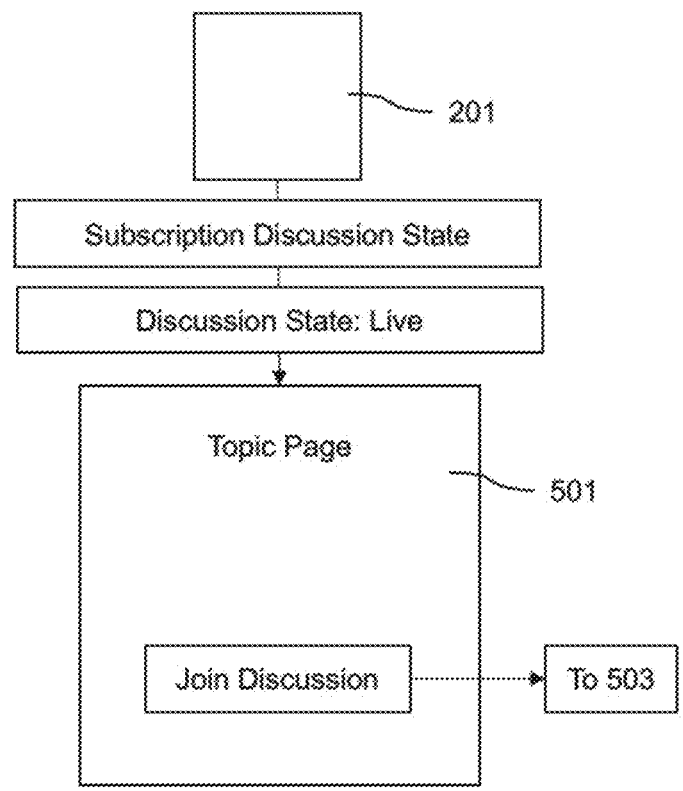
FIG. 5 shows schematically a set of web pages between which participant devices may be moved in implementations of the method of FIG. 3.
Figure 5:
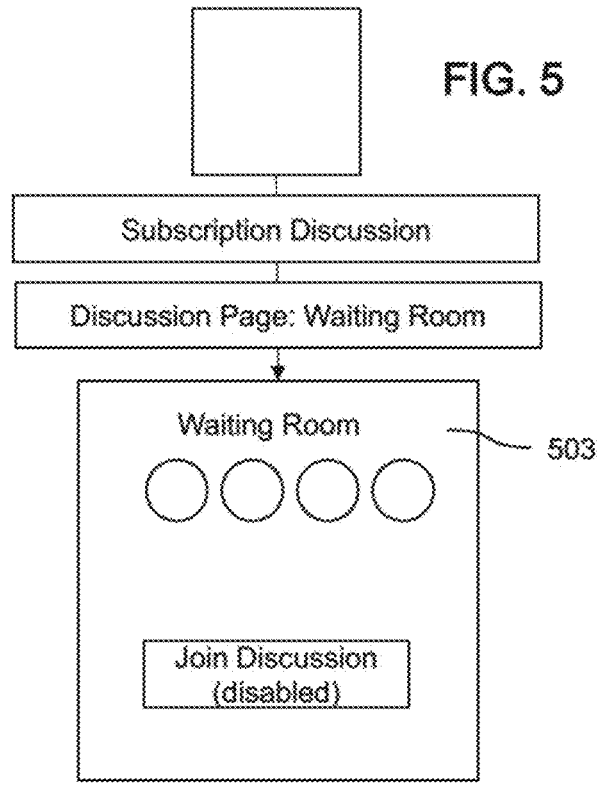
Figure 5:
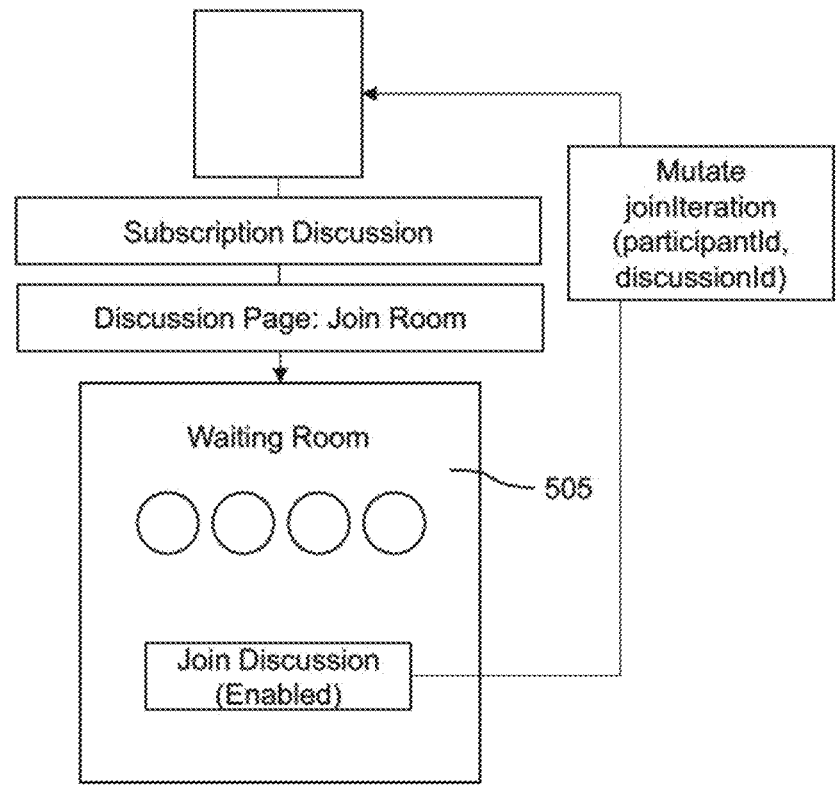
Figure 5:
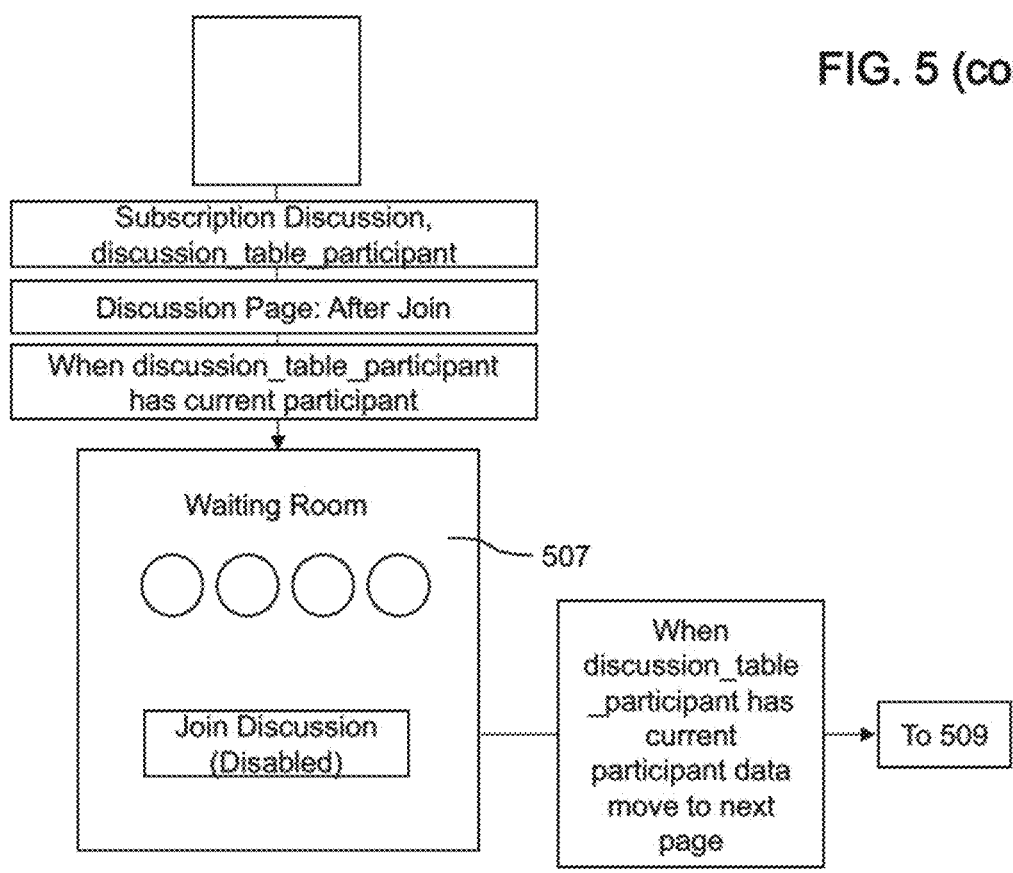
Figure 5:
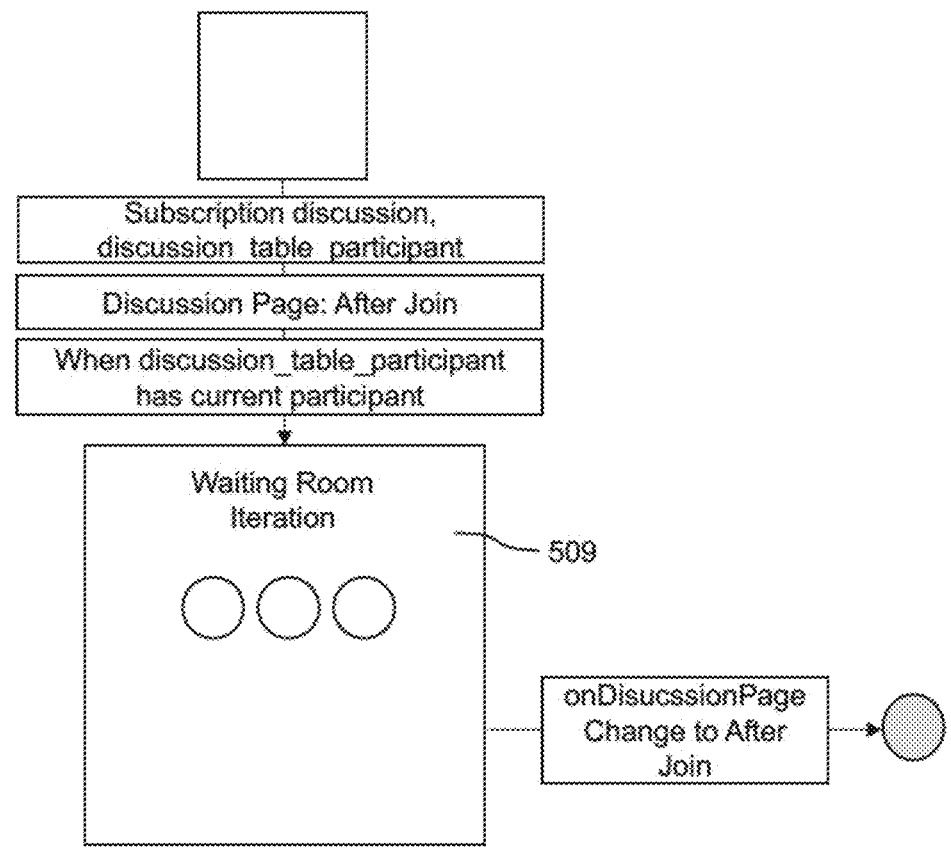
Figure 5:
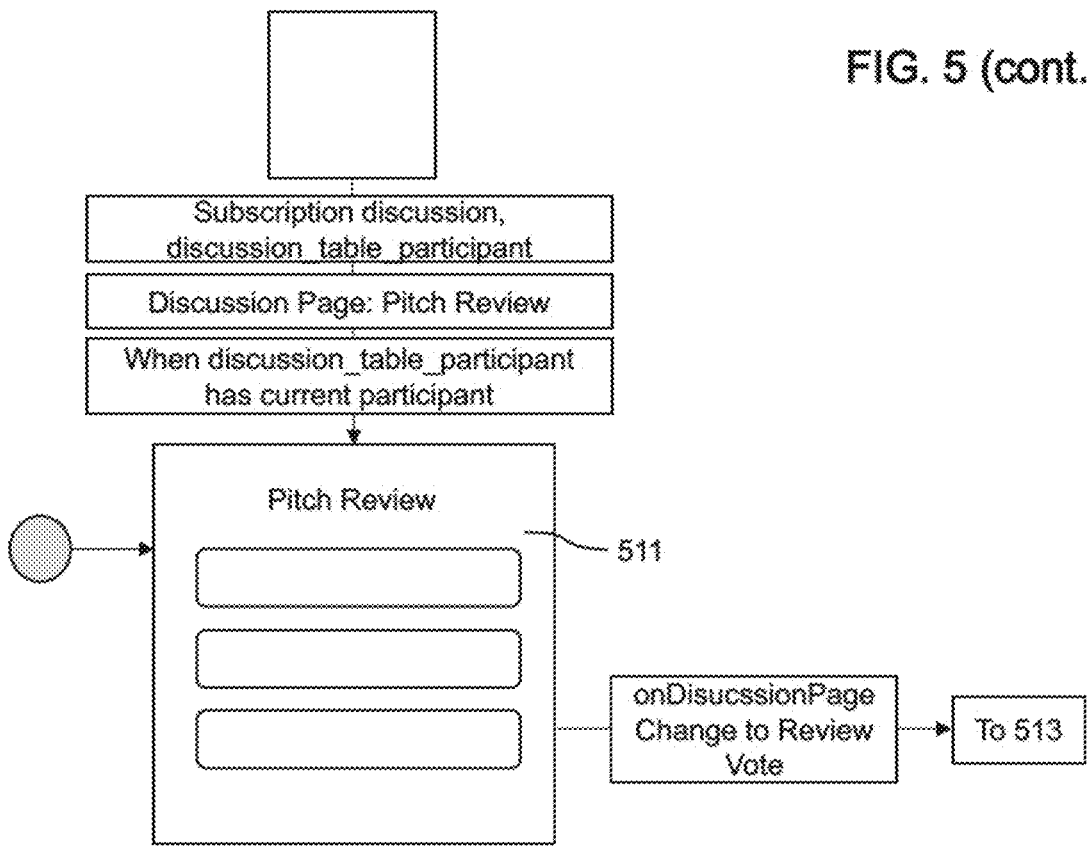
Figure 5:
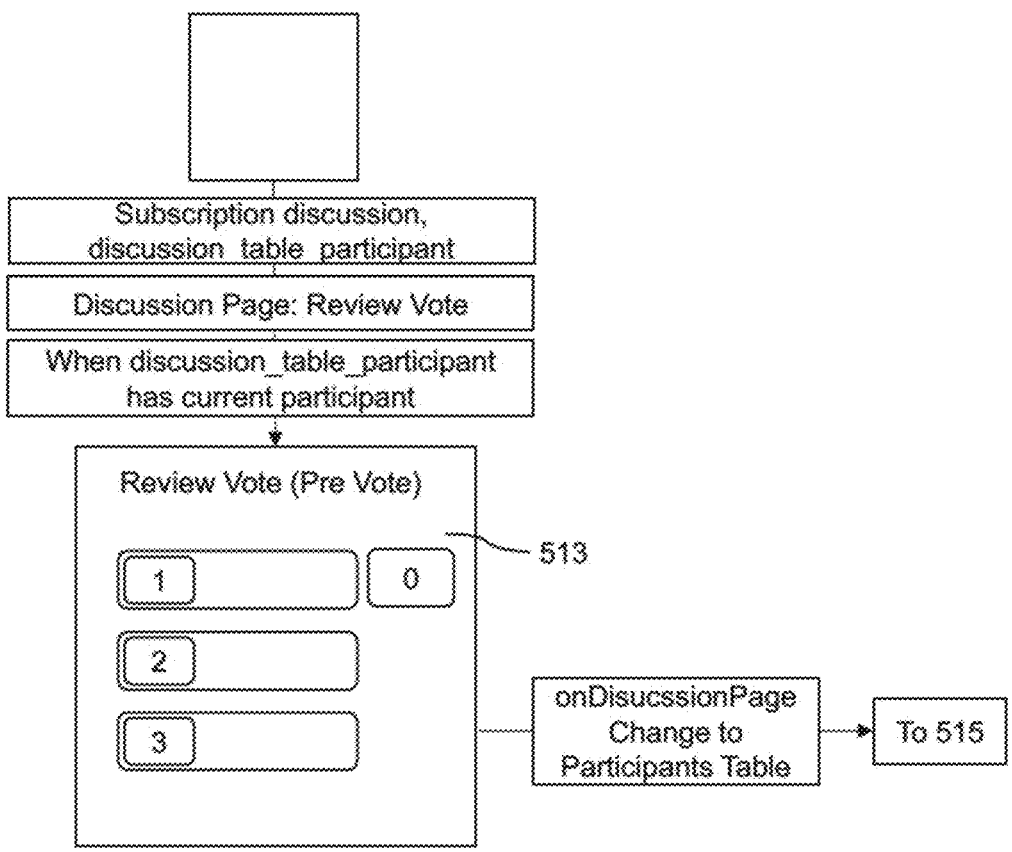
Figure 5:
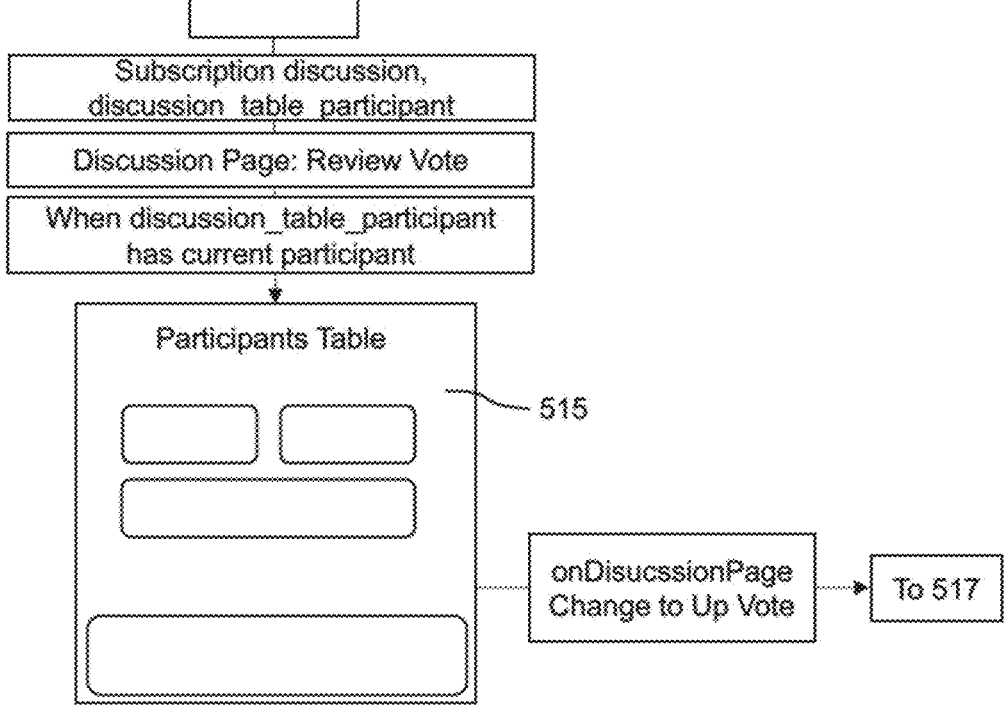
Figure 5:
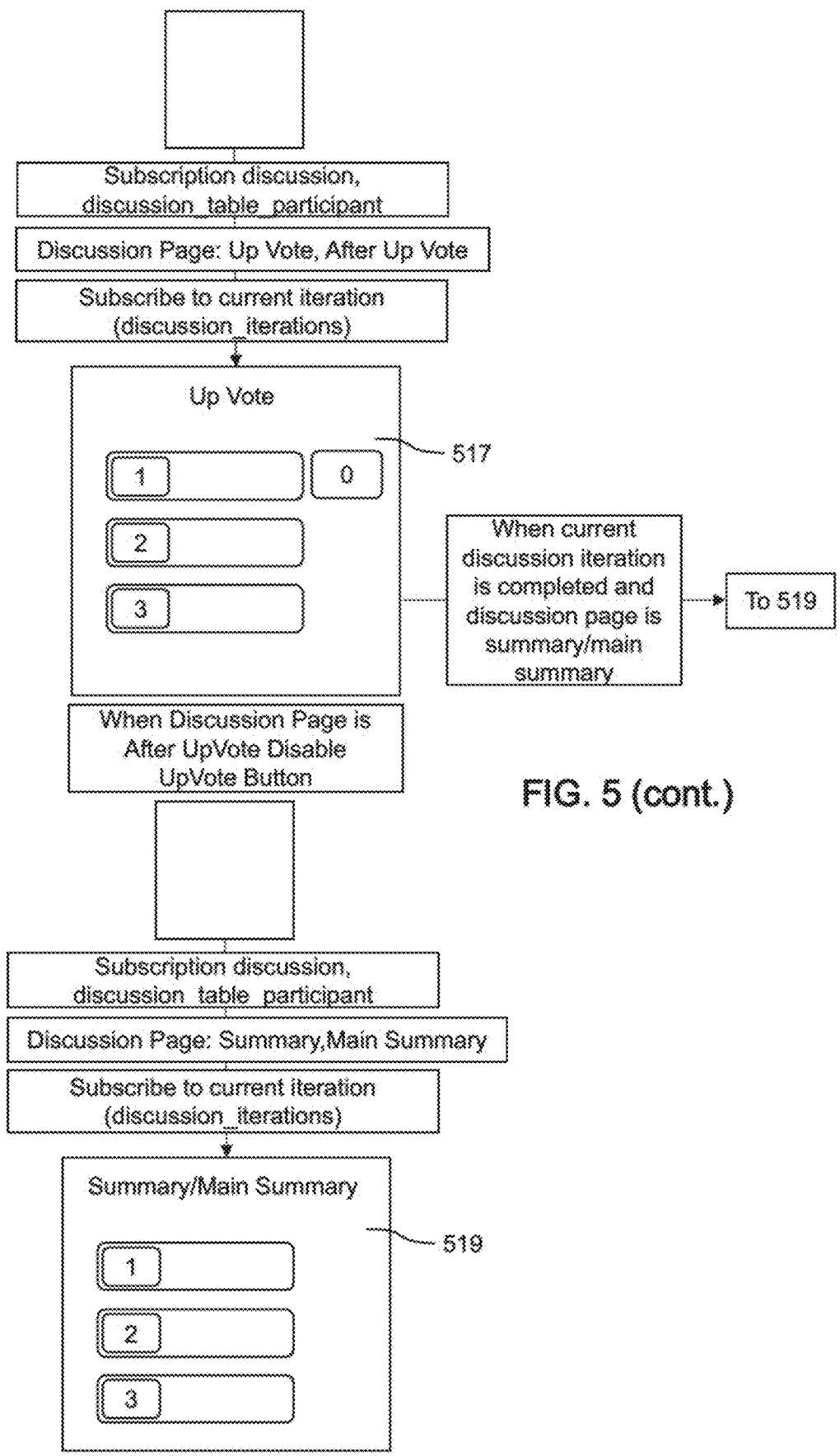

As noted previously, the interactions required to be performed by the participant devices may be facilitated through web pages displayed by the participant devices. FIG. 5 shows an example of a set of webpages suitable for this purpose. The webpages may be transmitted to the participant devices via the API component 201 of the software architecture described previously with reference to FIG. 2.

Once a participant devices connected to the server 101 in step 301, a topic page 501 may be displayed. This page may display information about the topic of the decision to be made.

Participant devices that have successfully connected to the server 101 may be moved from the topic page 501 into a waiting room 503 while waiting for the other participant devices to connect. This waiting room may be configured to permit communications between all of the participant devices that are in connection with the server 101 at this time.

When all of the participant devices have connected to the server 101, or when initiated manually by the administrator, they may be presented with a "Join discussion" button on webpage 505. Interacting with this button by the user of the participant device causes the participant device to transmit information to the server signifying that the participant device is ready to participate in the discussion. Once the participant devices has confirmed its readiness in this way, the "Join discussion" button may then be disabled on this webpage as shown by 507.

Once all of the participant devices have indicated their readiness, the participant devices may be allocated to their respective device groups in step 305, whereupon the display changes to a pitch review screen 511 in which each participant device can view information relating to the options assigned to the participant devices within its device group. Transmitting the options to the participant devices in step 309 may be implemented by displaying information about the options on the pitch review screen 511.

The participant devices may optionally next be presented with a pre-vote review screen 513 in which they are able to submit a vote that is non-binding (in the sense that it does not constitute one of the selections received in step 313 and thus does not affect which option is subsequently designated as the consensus option).

The display then moves to a discussion screen 515, which may be displayed while the participant devices within each device group are permitted to exchange information (e.g. messages and/or participate in an audio or video conference) with one another. The options represented by the participant devices in the respective device group and a list of the participant devices in the device group could be displayed on this screen.

Next, the display moves to a voting screen 517 through which each participant device may submit its selection of one of the options that were transmitted to it. The selections may be transmitted to the server 101 by the participant device 103, 105 via the user interface component 205. Finally, the display may move to a summary page 519 which displays the results of the votes collected within the respective master group and indicates which of the options has been designated as the consensus option for that master group as the outcome of the iteration that has just been performed. After completing an iteration of steps 305-319, the participant devices may be returned to the waiting room described above. On subsequent iterations, the display will again progress through screens 511-519 as the steps of transmitting the options and receiving selections from the participant devices are iterated again.

The progression of the display from one page to the next may be controlled by the API module 201 by updating the table on the server 101 to which the participant devices 103, 105 as described previously.

The invention claimed is:

1. A computer-implemented method of collaborative decision making between a plurality of participant devices, the method comprising:
  establishing a connection between a server and each of the participant devices, wherein the participant devices are remote from the server;
  assigning to each of the participant devices connected to the server one of a plurality of options;
  (a) establishing, by the server, a plurality of device groups and assigning each of the participant devices to one of the device groups such that there are two or more differing assigned options across the participant devices of each device group, the assigned options across a device group being defined as an option set;
  establishing, by the server, one or more master groups, each master group comprising one or more device groups which are assigned the same option set;
  (b) within each device group:
  (b1) transmitting to each respective plurality of the participant devices data comprising the option set assigned to the device group;
  (b2) establishing a communications link, via the server, between the participant devices of the device group, allowing communications between all devices within the device group for a set time period;
  (b3) receiving, at the server, a selection from each of the respective plurality of the participant devices of one of the options of the option set transmitted to it in step (b1), where the option that received the most selections within the device group is defined as the device group selection;
  (c) assigning, by the server, a consensus option of each master group to each of the participant devices within the master group, thereby replacing the option previously assigned to each participant device, where the consensus option comprises either:
  the option that received the most selections across all participant devices within the master group; or
  the option that received the most device group selections across all device groups of the master group;
  (d) closing the device groups; and
  performing at least one further iteration of steps (a) to (d) and outputting a decision result comprising the one or more remaining options assigned across the participant devices;
  wherein further iterations of steps (a) to (d) are performed until there is one remaining option assigned across the participant devices; and
  wherein step (c) comprises, in the case that there is no one option that received the most selections across all participant devices or device groups within the master group, determining the consensus option by one of:
  selecting one of a plurality of options that received the most selections by random selection;
  receiving a selection of one of a plurality of options that received the most selections from an administrator device; and
  processing data exchanged between the participant devices of the device groups during the set time period and selecting an option that was discussed for the longest time period.

2. The method of claim 1 wherein the server performs steps (a) to (d) in sequence according to a set time schedule.

3. The method of claim 1, wherein the server maintains a central clock and one or more of the steps are synchronized according to the central clock.

4. The method of claim 3 wherein, in step (b2) the server synchronises the set time period across all device groups such the set time periods start and end at the same time according to the central clock.

5. The method of claim 3, wherein step (d) is performed at a predetermined time interval after establishing the device groups, wherein the predetermined time interval is measured by the central clock maintained by the server.

6. The method of claim 1 further comprising, after establishing a connection between the server and each of the participant devices:
  receiving, at the server, option data from each of the participant devices, the option data comprising an option proposed by the participant device, where the option data comprises one or more of text, audio and video data; and
  assigning the proposed option to the respective participant device.

7. The method of claim 6 wherein the option data comprises an editable text document, wherein step (b3) comprises receiving, from one or more participant devices, an edited version of a text document comprising an option received from another participant device of the device group.

8. The method of claim 1, further comprising, before step (a):
  receiving, by the server, information identifying each of the participant devices; and
  verifying that each of the participant devices identified in the received information is in communication with the server.

9. The method of claim 8, wherein the verifying comprises:
  establishing, on the server, a waiting room in communication with each of the participant devices, and
  recording on the server presence data about each of the participant devices in communication with the waiting room, wherein the presence data identifies whether the participant device is in communication with the server.

10. The method of claim 9, further comprising, before step (a), verifying that the recorded presence data confirms that each of the participant devices identified in the received information is in communication with the server.

11. The method of claim 9, further comprising transmitting, to each of the participant devices in communication with the waiting room, information identifying each of the other participant devices in communication with the waiting room.

12. The method of claim 1, wherein the data transmitted in step (b1) comprises one or more of text, images, audio and video.

13. The method of claim 1, wherein step (a) comprises:
  randomly allocating each participant device to a respective one of the device groups, and
  establishing communications between each of the device groups and the participant devices allocated to it.

14. The method of claim 1, wherein on a second and any subsequent iterations step (a) comprises allocating each participant device to a respective one of the device groups so as to minimize the number of participant devices that have been in the same device group in a previous iteration.

15. The method of claim 1, wherein step (b2) comprises facilitating, by the server, intercommunications between the participant devices in communication within the device group to allow for discussion of the options assigned to the participant devices of the group.

16. The method of claim 15, wherein the intercommunications comprise an exchange of one or more of text, audio and video data.

17. The method of claim 1, wherein in a first iteration of step (a), each of the established master groups contains exactly one device group.

* * * * *